United States Patent [19]
Cawley

[11] 3,942,912
[45] Mar. 9, 1976

[54] METHOD FOR CONTROLLING THE OPERATION OF TWO-SPEED, REFRIGERANT MOTOR COMPRESSORS

[75] Inventor: Richard E. Cawley, Hurst, Tex.

[73] Assignee: Lennox Industries Inc., Marshalltown, Iowa

[22] Filed: Oct. 4, 1974

[21] Appl. No.: 512,084

[52] U.S. Cl. .............................. 417/53; 417/410
[51] Int. Cl.² .................................... F04B 17/00
[58] Field of Search ................. 417/53, 410, 419

[56] References Cited
UNITED STATES PATENTS

| | | |
|---|---|---|
| 3,008,629 | 11/1961 | Gerteis ............................ 417/419 |
| 3,380,650 | 4/1968 | Drummond ........................ 417/53 |

Primary Examiner—William L. Freeh
Attorney, Agent, or Firm—Seymour Rothstein

[57] ABSTRACT

A method is disclosed for controlling the operation of a two speed electrical motor used to drive a hermetic refrigerant compressor so as to attain an overall motor compressor efficiency at low speed operation which is equal to or greater than the overall motor compressor efficiency at high speed operation.

3 Claims, 1 Drawing Figure

METHOD FOR CONTROLLING THE OPERATION OF TWO-SPEED, REFRIGERANT MOTOR COMPRESSORS

BACKGROUND AND SUMMARY OF THE INVENTION

This invention relates to a method of controlling the operation of a two-speed motor compressor that may selectively be operated at a predetermined high speed or at a predetermined low speed and that is used to drive a hermetic refrigerant compressor, and more particularly, to a novel method of controlling the operation of such two-speed electrical motor, so as to attain an overall motor compressor efficiency at low speed operation which is equal to or greater than the overall motor compressor efficiency at high speed operation.

Even before energy conservation became a matter of general, popular interest, the art had been concerned about minimizing the amount of energy consumed by heating, ventilating, and air conditioning equipment. Such concern has motivated scrutiny of equipment designs and application practices and procedures.

It has long been standard practice to "size" air conditioning equipment utilized in light commercial applications so that it can have ample cooling capacity for peak load conditions. To provide comfort under part load conditions, which are present during a large portion of the time, provisions are then made so that a given system can operate at a cooling capacity level somewhat lower than that used during peak load conditions. With the refrigerant compressor used in the air conditioning system, such provisions have included, inter alia, cylinder unloading mechanisms, suction valve lifting mechanism, and hot gas by-pass valves. While most provisions utilized for unloading refrigerant compressors have satisfied the comfort aspects of light commercial applications and some have reduced gross energy consumption, their characteristics have been to provide lower efficiency when unloaded than when loaded.

Recently, it has been proposed to affect capacity control of a hermetic refrigerant compressor by driving the compressor by a two-speed electric motor. U.S. Pat. No. 3,584,980, issued June 15, 1971 to Richard E. Cawley and Charles B. Ellis discloses such a hermetic two-speed motor compressor system wherein the motor drives the compressor at a high speed during peak load conditions and drives the compressor at a lower speed during part load conditions.

The novel method of my present invention is directed to a two-speed, motor compressor system of the type disclosed in U.S. Pat. No. 3,584,980. By the use of my method, the operation of the two-speed motor compressor system can be controlled such that the overall coefficient of performance (efficiency) of the system at the lower speed, i.e., during part load conditions, is equal to or greater than the coefficient of performance (efficiency) of the system at the higher speed, during peak load conditions. Basically my novel method comprises the steps of imposing a first torque load on the two-speed electric motor during peak load operation and under a given set of evaporating and condensing conditions and then imposing a second torque load on the electric motor during part load operation and under the same set of evaporating and condensing conditions such that the ratio of the second torque load to the first torque load is equal to or less than the ratio of the motor efficiency at part load operation to the motor efficiency at peak load operation.

Accordingly, an object of the present invention is to provide a novel method of controlling the operation of a hermetic two-speed, electric motor driven, refrigerant compressor so as to attain an overall compressor efficiency at low speed operation which is equal to or greater than the overall motor compressor efficiency at high speed operation.

This and other objects and advantages of the present invention will become apparent from the following description of the preferred embodiment of the invention described in connection with the accompanying drawing.

DETAILED DESCRIPTION OF THE PREFERRED EMBODIMENT

Figure 1:
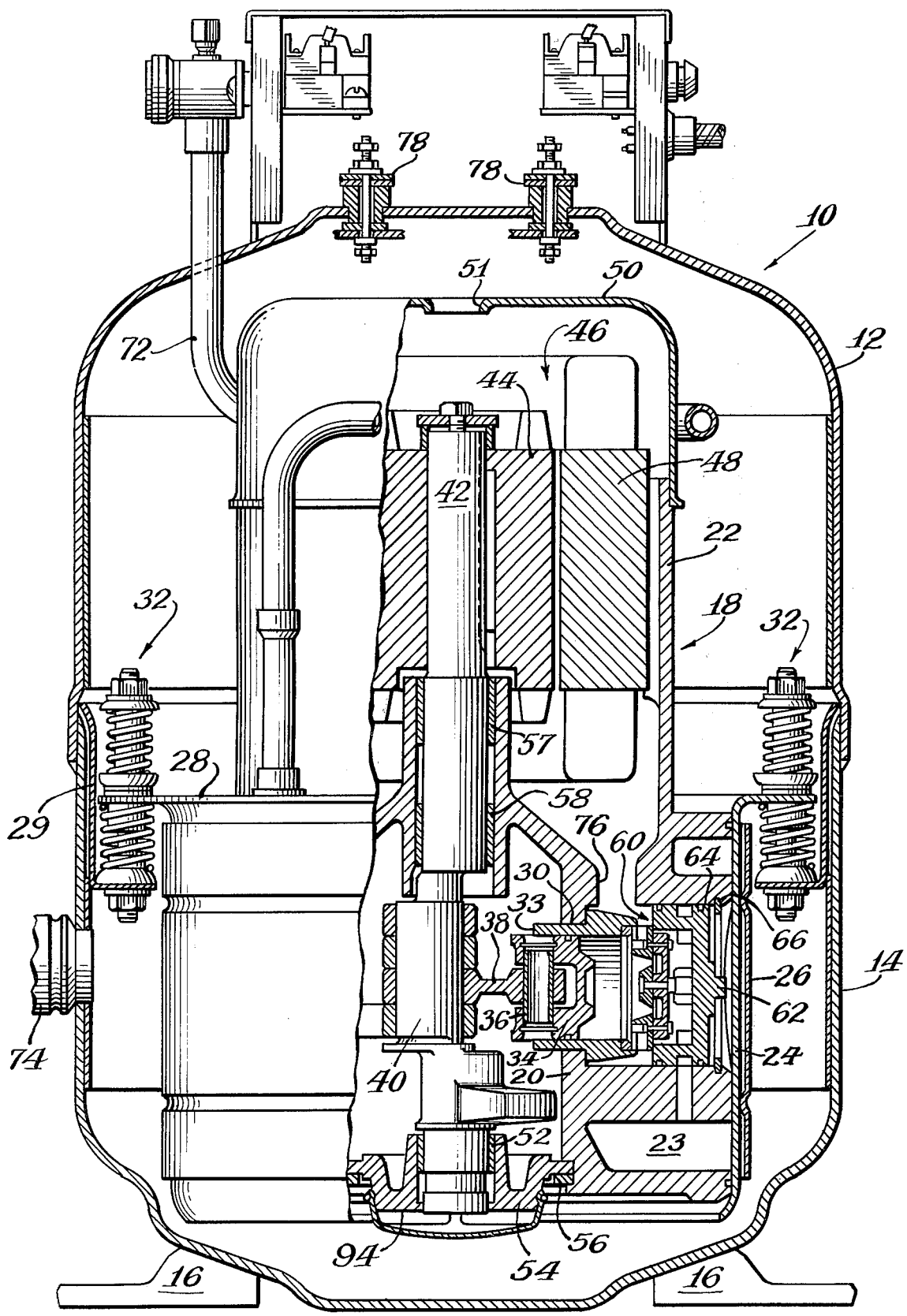
FIG. 1 is a side elevational view, partially in section and with some parts broken away, of a hermetic refrigerant compressor that is driven by a two-speed electric motor.

FIG. 1 illustrates a two-speed motor compressor 10 of the type whose operation may be controlled by the novel method of the present invention. Motor compressor 10, similar in basic design to the motor compressor described in U.S. Pat. No. 3,584,980, includes a gastight, hermetically enclosed outer casing or housing including an upper shell 12 and a lower shell 14 integrally joined to one another, as for example, by welding. To the bottom of the exterior surface of the lower shell 14 are welded a plurality of legs 16 by means of which legs the compressor may be supported in an upright position within a condensing unit or an air conditioning unit.

Supported within the outer casing of the compressor 10 is a compression mechanism 18 which includes a compressor block having a crankcase portion 20 and a motor flange portion 22. An annular sleeve 24 made from sheet metal surrounds the crankcase portion 20 of the compressor block and cooperates therewith to define an annular discharge gas cavity 23 in the compression mechanism. A heat shield 26 is disposed about the annular sleeve in space relationship thereto.

The annular sleeve 24 includes an out-turned upper flange 28. Secured to the lower shell 14 of the outer casing is an annular flange member 29. Spring means 32 cooperate between the flange 28 and flange member 29 for resiliently supporting the compression mechanism 18 within the outer casing of compressor 10.

Provided within the compressor block are a plurality of radially oriented cylinders 30. Though a four-cylinder compressor is illustrated, it will be understood that the present invention may be used in a hermetic refrigerant compressor having other cylinder configurations. Cylinder sleeve or liners 33 are provided in each of the cylinders 30 and a piston 34 is slidably mounted for reciprocation within each of the cylinder lines 33. Each piston 34 has mounted therein a wrist pin 36 upon which is journaled one end of a connection rod 38. The other end of each connecting rod 38 is affixed to the eccentric portion 40 of drive shaft or crankshaft 42.

Provided at the end of each cylinder 30 for closing the end of each cylinder cavity is a valve assembly 60. The valve assemblies 60 each comprise a discharge valve unit and a section valve unit operable in a known manner. Each valve assembly 60 is held in place in the end of a cylinder 30 by a cylinder head or cap 62. A Belleville spring 64 and a retaining ring 66 cooperate with the cylinder head 62 to maintain the head in position closing the end of the cylinder. The annular space 23 provided within the compression mechanism between the compressor block and the sleeve 24 communicates each of the cylinders and receives the discharge gases from the cylinders and conveys them to the discharge line 72.

The drive shaft 42 is disposed in an upright position within the compression mechanism 18 and is connected at its upper end to the rotor 44 of the electric drive motor 46. The motor includes a stator 48 which is supported within the motor flange portion 22 of the compressor block and the rotor 44 which is inductively connected to the stator 48.

The design of the motor 46 may be consequent pole, one winding configuration with the two pole (high speed) connected parallel-Y and the four pole (low speed) connected in Y series. Motor 46 can be utilized to operate at a relatively high speed, i.e., on the order of 3,600 r.p.m., during two pole operation and at a lower speed, i.e., on the order of 1,800 r.p.m., during four pole operation. The characteristics of one form of motor which could be utilized are as follows:

and the compression mechanism below the flange 29. The gas passes from the first compartment into a second compartment or annular space defined between the flanges 29 and 28 and then into a third compartment defined between the outer casing and the top of the compression mechanism 18. From the third compartment, the suction gas passes through the opening 51 in the top of the end cap 50 over the electric motor 46 for cooling same and then through the openings 76 in the compressor block into the cylinders 30. The gases are compressed within the cylinders and forced through the valve assemblies 60 into the annular discharge gas cavity 23. From the annular discharge gas cavity 23, the compressed gas passes through the discharge line 72 to the condenser of the refrigeration system in which the compressor is utilized.

A plurality of terminals 78 are provided in the top of the upper shell 12 in order to conduct electric current from a suitable source to the electric motor 46 and to provide for connection of suitable motor protection while preserving the hermetic nature of the compressor.

In developing the novel method of the present invention, it was determined that in a two-speed compressor, such as described above, the capacity (Q) is roughly

HIGH SPEED

| Remarks | Torque lb/ft. | Voltage | Minimum Speed r.p.m. | Minimum motor efficiency, percent |
|---|---|---|---|---|
| Maximum load | 31.25 | 187 | 3,235 | 79.5 |
|  | 31.25 | 240 | 3,420 | 88 |
|  | 31.25 | 264 | 3,450 | 88 |
| Rated Load | 25 | 187 | 3,340 | 84 |
|  | 25 | 240 | 3,460 | 90 |
|  | 25 | 264 | 3,480 | 90 |
| Minimum flow rate | 19.5 | 187 | 3,420 | 87.5 |
|  | 19.5 | 240 | 3,490 | 91 |
|  | 19.5 | 264 | 3,510 | 90.5 |

LOW SPEED (4 pole) - Load Points Are At Same Evaporating and Condensing Conditions As For High Speed.

| Remarks | Torque lb/ft. | Voltage | Minimum Speed, r.p.m. | Minimum Motor Efficiency, % |
|---|---|---|---|---|
| Maximum load | 26.5 | 187 | 1,620 | 79.5 |
|  | 26.5 | 240 | 1,710 | 74.5 |
|  | 26.5 | 264 | 1,725 | 74.5 |
| Rated load | 21.2 | 187 | 1,670 | 71 |
|  | 21.2 | 240 | 1,730 | 76.5 |
|  | 21.2 | 264 | 1,740 | 76.5 |
| Minimum flow rate | 16.5 | 187 | 1,710 | 74 |
|  | 16.5 | 240 | 1,745 | 77 |
|  | 16.5 | 264 | 1,750 | 76.5 |

Enclosing the top of the motor 46 is an end cap 50 which is suitably connected to top of the motor flange portion 22 of the compressor block. Drive shaft 42 is journaled at its lower end within a lower bearing 52 mounted in lower bearing head 54. The lower bearing head 54 is maintained in position by a suitable wedge-lock spring or retaining ring 56 seated within an annular groove in the lower crankcase portion 20 of the compressor block. Intermediate its ends the drive shaft 42 is journaled within the spaced bearings 57 and 58 in the hub portion or partition portion 21 of the compressor block.

Suction gas enters the outer casing or housing of the compressor via the suction line inlet 74 and flows into a first compartment defined between the outer casing proportional to speed, thus:

$$Q = K_c N \tag{1}$$

where:
$K_c$ is a constant which takes into account bore, stroke, etc., and
$N$ is the speed of the motor
Input is:

$$W_k = \frac{K_w TN}{N_m} \tag{2}$$

where:
$K_w$ is a constant which takes into account the conversion factors, $N_m$ is the motor efficiency, and $T$ is the torque imposed on the motor by mechanical load The coefficient of performance (COP) or the efficiency of the overall motor compressor would then be:

$$COP = \frac{Q}{W_k} = \frac{K_c N N_m}{K_{tr} T N} = \frac{K_c}{K_{tr}} \frac{N_m}{T} \qquad (3)$$

Then if the high speed operation be case 1 and the low speed operation be case 2 then;

$$\frac{COP_2}{COP_1} = \frac{\left(\frac{K_c}{K_{tr}}\right) \frac{N_{m2}}{T_2}}{\left(\frac{K_c}{K_{tr}}\right) \frac{N_{m1}}{T_1}} = \left(\frac{T_1}{T_2}\right)\left(\frac{N_{m2}}{N_{m1}}\right) = \frac{\frac{N_{m2}}{N_{m1}}}{\frac{T_2}{T_1}} \qquad (4)$$

Therefore, to attain equal overall efficiencies for such a motor compressor, torque loads must be imporsed on the electric motor at both the high speed and low speed such that:

$$COP_2 = \frac{\frac{N_{m2}}{N_{m1}}}{\frac{T_2}{T_1}} (COP_1) \qquad (5)$$

where $N_{m1}$ and $N_{m2}$ are known from design considerations and, where $T_1$ and $T_2$ are imposed under the same, given set of evaporating and condensing conditions, i.e., with the same pressures and temperatures applied to the compressor.

In addition, of course, it should be recognized that the $T_1$ and $T_2$ may be set and in this instance, the motor efficiency requirement for low speed operation could be found for a given high speed motor efficiency. Furthermore, it should be noted that the low speed torque will always be less than the high speed torque because in a shift from high to low speed: (a) the torque required for overcoming mechanical friction (bearings, rods, pistons, etc.) will be reduced approximately directly with the reduction in speed; and (b) the torque required for overcoming refrigerant pressure drops internally will be reduced approximately in proportion to the square of the reduction in speed.

In summary, the novel method of the present invention can be utilized to control the operation of a two-speed, hermetic motor compressor so as to attain an overall efficiency for the motor compressor at low speed operation which is equal to or greater than the overall efficiency for the motor compressor at high speed operation. In accordance with this novel method, a first torque load is imposed on the motor during high speed operation and under a given set of evaporating and condensing conditions and then a second torque load is imposed on the motor during low speed operation and under the same set of evaporating and condensing conditions such that the ratio of the second torque load to the first torque is equal to the ratio of the efficiency of the motor at low speed to the efficiency of the motor at high speed.

While there has been described a presently preferred embodiment of the invention, it will be obvious that other embodiments will be apparent to those skilled in the art. It is, therefore, intended that the invention be limited only within the scope of the appended claims.

What is claimed is:

1. A method of controlling the operation of a two-speed electric motor that may be selectively operated at a predetermined high speed or at a predetermined low speed and that is used to drive a hermetic refrigerant compressor so as to attain an overall motor compressor efficiency at low speed operation which is equal to or greater than the overall motor compressor efficiency at high speed operation, the method comprising the steps of:

imposing a first torque load on the electrical motor at high speed operation and under a given set of evaporating and condensing conditions and imposing a second torque load on the electrical motor at low speed operation and under the same set of evaporating and condensing conditions so that the ratio of the second torque to the first torque is at least equal to the ratio of the efficiency of the electrical motor at low speed operation to the efficiency of electrical motor at high speed operation.

2. The method described in claim 1 wherein the ratio of the second torque load to the first torque load is less than the ratio of the efficiency of the electrical motor at low speed operation to the efficiency of the electrical motor at high speed operation.

3. A method of controlling the operation of a two-speed electric motor that may be selectively operated at a predetermined high speed or at a predetermined low speed and that is used to drive a refrigerant compressor so as to attain an overall motor compressor efficiency at low speed operation which is equal to or greater than the overall motor compressor efficiency at high speed operation, the method comprising the steps of:

imposing a first torque load on the electrical motor at high speed operation and under a given set of evaporating and condensing conditions;

imposing a second torque load on the electrical motor at low speed operation and under the same set of evaporating and condensing conditions, in accordance with the formula:

$$COP_2 = \frac{\frac{N_{m2}}{N_{m1}}}{\frac{T_2}{T_1}} (COP_1)$$

wherein:

$COP_2$ is the overall Coefficient of Performance (efficiency) for the motor compressor at the low speed;

$COP_1$ is the overall Coefficient of Performance (efficiency) for the motor compressor at the high speed;

$N_{m2}$ is the electrical motor efficiency at the low speed;

$N_{m1}$ is the electrical motor efficiency at the high speed;

$T_2$ is the torque imposed on the electrical motor at the low speed and at a given set of evaporating and condensing conditions; and $T_1$ is the torque imposed on the electrical motor at the high speed and at the same set of evaporating and condensing conditions.

* * * * *